J. O'GARA.
WATER DRIVEN ENGINE.
APPLICATION FILED JULY 7, 1916.
1,221,085.
Patented Apr. 3, 1917.
5 SHEETS—SHEET 3.
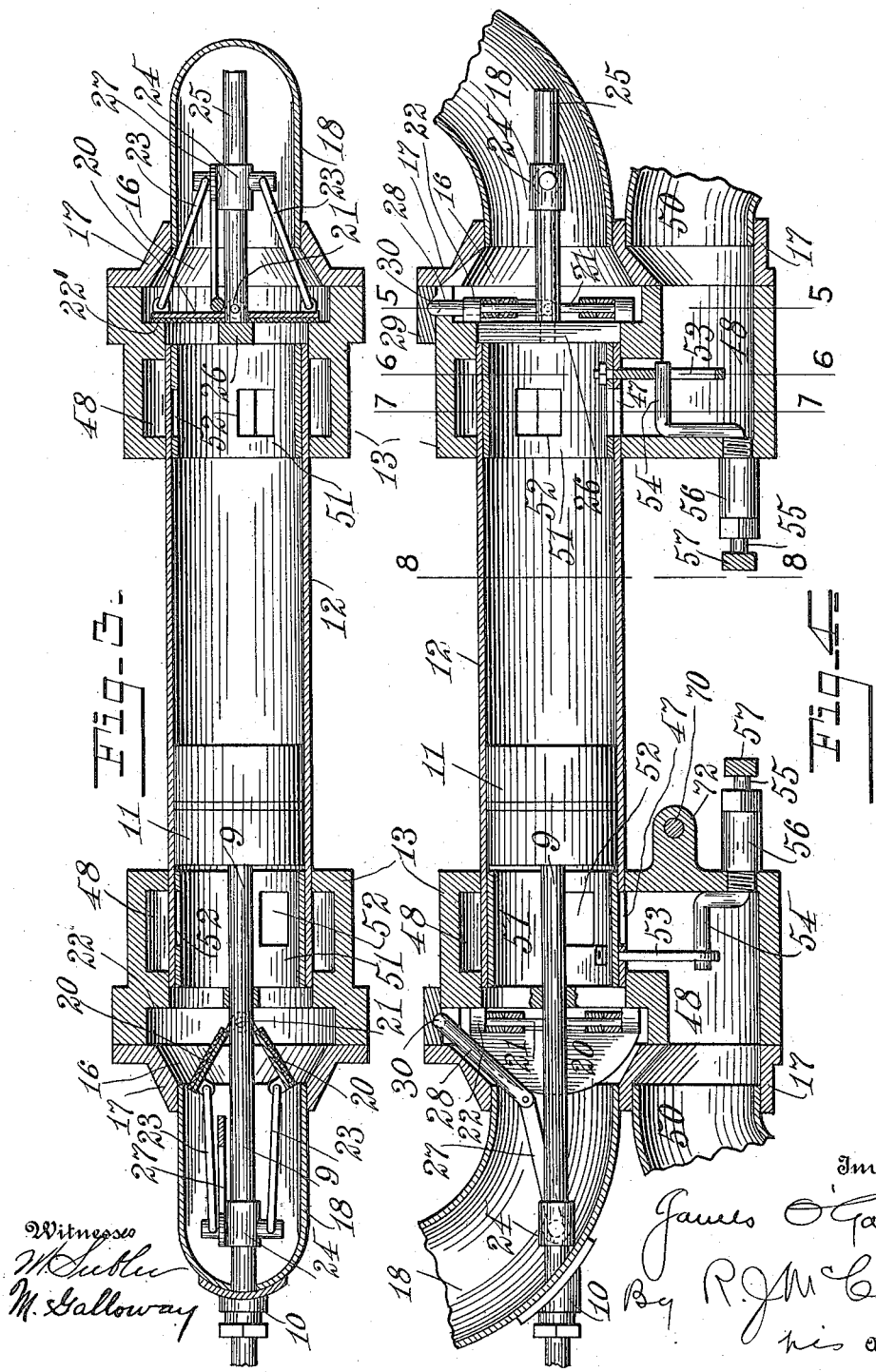

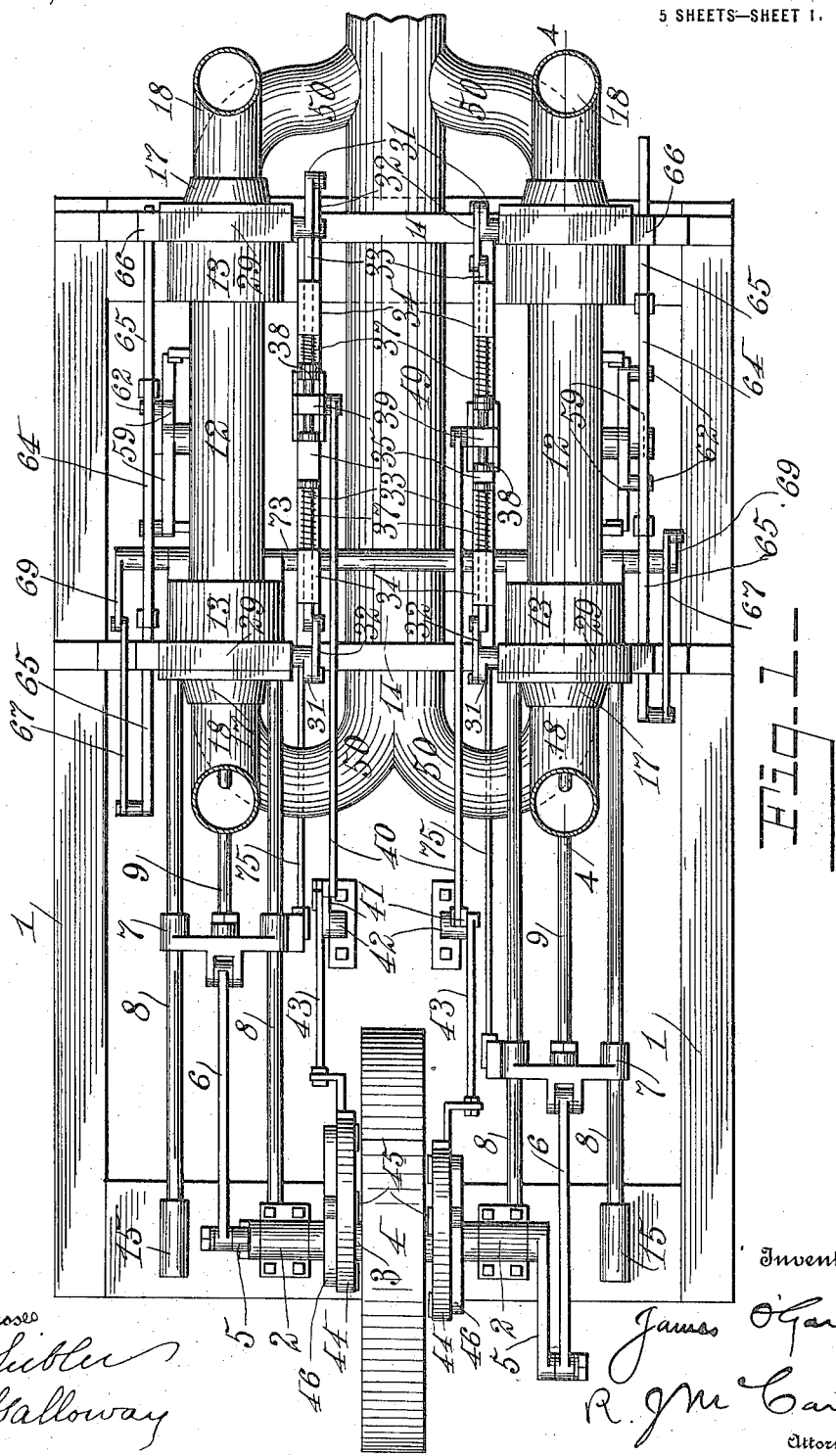

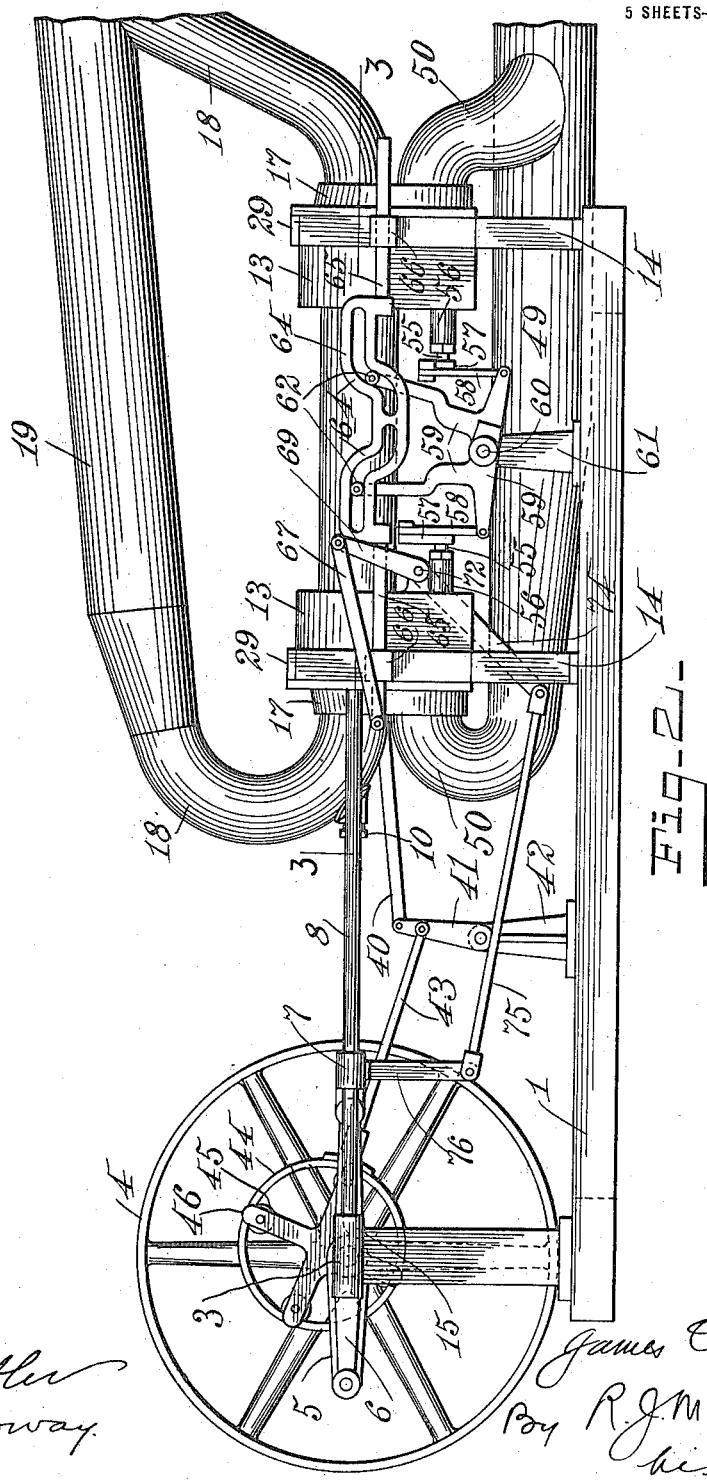

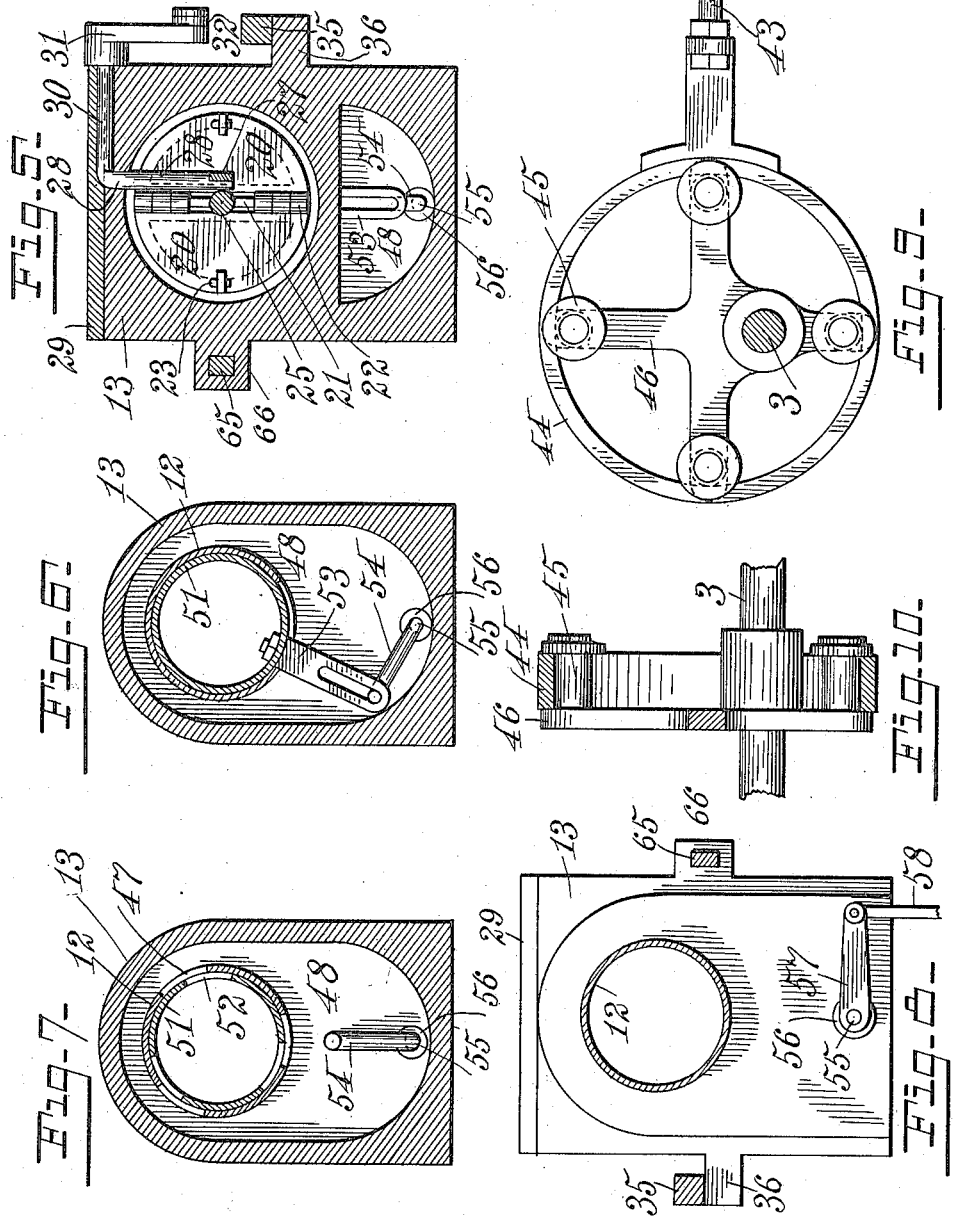

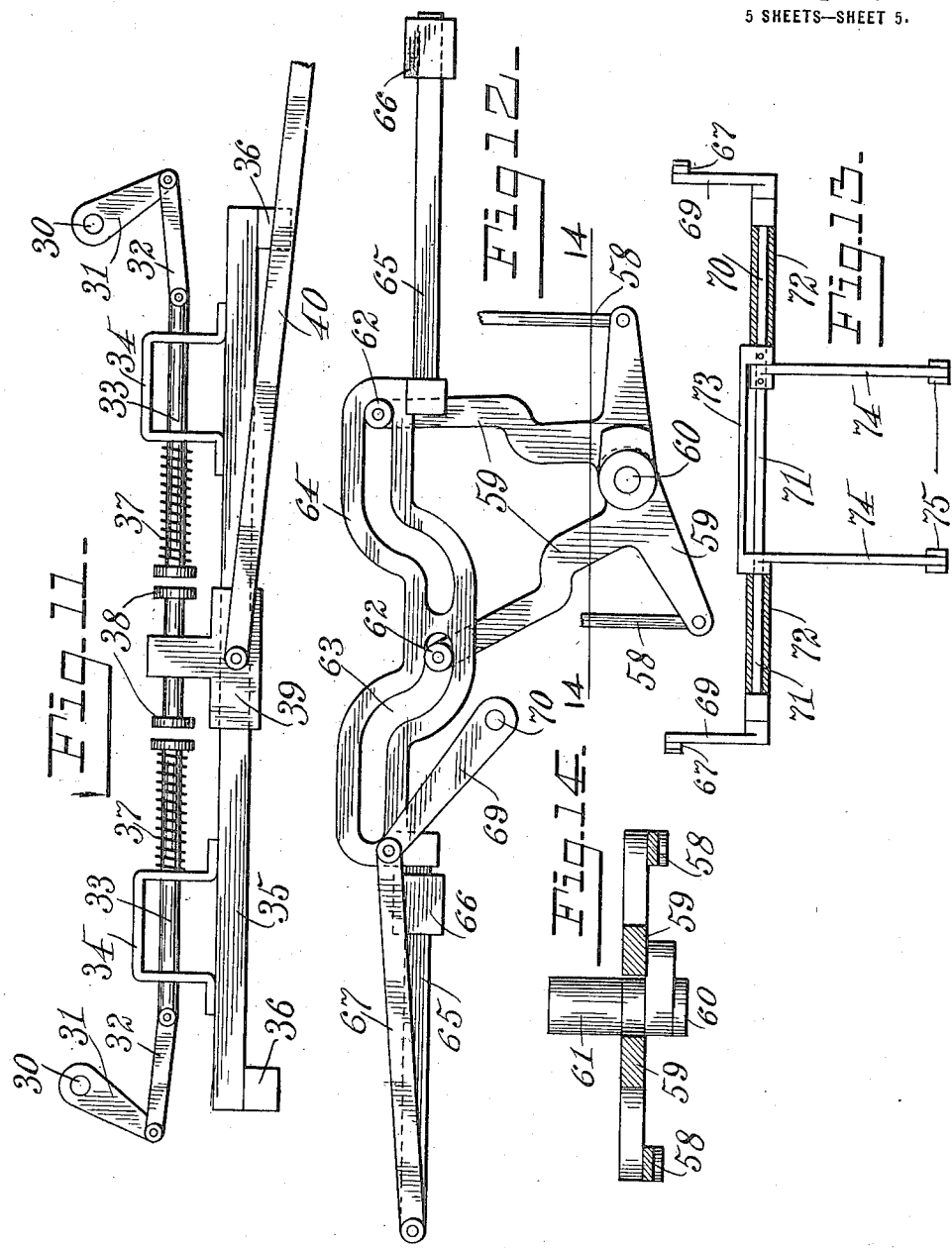

UNITED STATES PATENT OFFICE.

JAMES O'GARA, OF DAYTON, OHIO.

WATER-DRIVEN ENGINE.

1,221,085.

Specification of Letters Patent.

Patented Apr. 3, 1917.

Application filed July 7, 1916. Serial No. 108,065.

*To all whom it may concern:*

Be it known that I, JAMES O'GARA, a citizen of the United States, residing at Dayton, in the county of Montgomery and State of Ohio, have invented certain new and useful Improvements in Water-Driven Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in engines adapted to be driven by the force of water discharged from a reservoir located at an elevation. The object of the invention is to provide an engine of this type in which the force of the water is utilized to the greatest extent to drive the pistons of the engine and whereby an efficient engine is the result.

Preceding a more complete description of my invention, reference is made to the accompanying drawings of which Figure 1 is a top plan view of the complete engine containing two cylinders; Fig. 2 is a side elevation of the same; Fig. 3 is a section through one of the cylinders on the line 3—3 of Fig. 2; Fig. 4 is a section on the line 4—4 of Fig. 1; Fig. 5 is a section on the line 5—5 of Fig. 4; Fig. 6 is a section on the line 6—6 of Fig. 4; Fig. 7 is a section on the line 7—7 of Fig. 4; Fig. 8 is a section on the line 8—8 of Fig. 4; Figs. 9 and 10 are detail views of the eccentric; Fig. 11 is a detail view of the means for operating the inlet and cut-off valves; Fig. 12 is a detail view of the means for operating the exhaust valves; Fig. 13 is a detail view of the shaft and parts through which the pressure is shut off from the cylinders and allowed to exhaust; and Fig. 14 is a section on the line 14—14 of Fig. 12.

In a description and in the drawings, similar reference characters are employed to indicate corresponding parts.

Mounted upon the front end of the foundation or engine base 1 are two journal boxes or bearings 2—2 in which a crank shaft 3 is journaled. Upon the crank shaft 3 a fly-wheel 4 is mounted and two cranks 5—5 each of which is placed at about an angle of 90°. Pivotally attached to the cranks 5—5 are connecting rods 6—6 which are pivotally connected to cross-heads 7—7 slidingly supported on guides 8—8. The cross-heads 7—7 are connected to piston rods 9—9 which extend through stuffing boxes 10—10. The rods 9—9 are connected with pistons 11—11 which reciprocate in cylinders 12—12. The said cylinders are provided with heads 13—13 supported from the base 1 by brackets 14—14. The heads 13—13 provide valve chambers, to be presently described. The said cylinder heads 13—13 further support the guides 8—8 at one end, the other ends of said guides being supported in the bearings 2—2 and on standards 15—15. The water is admitted into the cylinders 12—12 to drive the pistons as follows.

The said cylinder heads 13—13 are further provided with inlet chambers 16—16 that are inclosed by caps 17—17 from which extend inlet water pipes 18—18. The said pipes extend from a water supply pipe 19 which leads from the source of supply or reservoir. This reservoir is not shown but it may be of any well known form. Within the chambers 16—16 are two wing-valves 20—20 which are inlet and cut-off valves. These valves are pivoted on pins 21—21 supported in bearings 22—22 within the chamber 16—16. The valves 20—20 are suitably faced to provide for a proper seating against valve seats 22'—22' in the cylinder heads 13—13. When the valves 20—20 are closed or in the positions shown at the right in Fig. 3, the inlet of water to the cylinder 12 is closed. When said valves are in the positions shown at the left in Fig. 3, the inlet to the cylinder is open. The said valves 20—20 are actuated by the following means.

The said valves 20—20 are connected by rods 23—23 to cross-heads 24—24 slidingly mounted at one end of the cylinders on the rods 25—25 and at the other end of the cylinders on the piston rods 9—9. The rods 25—25 are supported by cross-frames or spiders 26—26. The cross-heads 24—24 are connected by means of connecting rods 27—27 with cranks 28—28 which extend from shafts 30—30 journaled in the cylinder heads 13—13 and caps 29—29 and on their outer ends they are provided with cranks 31—31; see Figs. 3 & 5. The cranks 31—31 are connected by means of rods 32—32 to horizontally sliding rods 33—33; see Fig. 11. The rods 33—33 are mounted in guides 34—34 which are supported upon a bearing 35 which in turn is supported by brackets 36—36 extending from the cylinder heads 13—13. The horizontally sliding rods 33—33 are moved in one direction to close the valves by the springs 37—37. The valves are positively opened against the tension of springs 37—37 and the water pressure by bumpers 38—38 mounted upon slides 39—39 movable upon the bearings 35—35. The slides 39—39 are connected by rods 40—40 to levers 41—41 pivoted to brackets 42—42 mounted upon the base 1. The levers 41—41 are pivotally connected to eccentric rods 43—43 extending from eccentric straps 44—44. The eccentric straps 44—44 have bearings on rollers 45—45 mounted upon the ends of arm 46—46. The said arms 46—46 are in the form of spiders which are mounted on the crank shaft 3 eccentric to the rollers 45—45, as seen in Fig. 3. The spiders 46—46 are mounted upon the shaft 3 at about an angle of 90° or the same as the cranks 5—5. It will be seen that during the rotation of the crank shaft 3, the eccentric straps 44—44 will impart a rocking movement to the levers 41—41 which will reciprocate the slides 39—39 and thereby operate the rods 33—33 and rock the shafts 30—30 which operation will open the valves 20—20 through the rods 27 and 23. When the slides 39—39 recede from the rods 33—33 during the rotation of the eccentrics 44—44, the springs 37—37 will close the valves 20—20. The exhaust from the cylinders 12—12 is controlled as follows.

The said cylinders 12—12 are provided with exhaust ports 47—47 which communicate with chambers 48—48 in the cylinder heads 13—13. The chambers 48—48 communicate with an exhaust pipe 49 through pipes 50—50. The exhaust ports 47 are opened and closed by oscillating cylinders 51—51 within the cylinders 12—12 at the ends thereof. The cylinders 51—51 constitute the exhaust valves and they are provided with ports 52 which are adapted to register or aline with the ports 47—47 when the exhausts are open. The said cylinders 51—51 are oscillated by slotted arms 53—53 which are attached thereto. The said slotted arms 53—53 are operatively connected with cranks 54—54 which extend from shafts 55—55 journaled in stuffing glands 56—56. The shafts 55—55 are provided with cranks 57—57 which are connected by means of links 58—58 to bell-crank levers 59—59 pivoted at 60 to brackets 61—61 mounted upon the base 1. The bell-crank levers 59—59 are provided with rollers 62—62 at their upper ends which ride in oppositely disposed cam races 63—63 in horizontally movable actuators 64—64. The actuators 64—64 are provided with guide rods 65—65 which find bearings in boxes 66—66 that extend from the outer sides of the cylinder heads 13—13. The forward guide rods 65, as seen at the left in Fig. 12, are pivotally connected to rods 67—67 which are also connected to cranks 69—69 mounted upon shafts 70 and 71; see Fig. 13. The shafts 70 and 71 are mounted in bearings 72—72 extending from the cylinder heads 13—13. The shaft 70 is connected by means of a yoke 73 to a lever 74 while the shaft 71 has a similar lever 74 directly mounted thereon. By the aid of this construction, the exhaust valves of one cylinder are cross-connected, being operated from the opposite cylinder. The levers 74—74 are connected to the cross-heads 7—7 through connecting rods 75—75 and brackets 76—76. It will, therefore, be seen that when the cross heads 7—7 are reciprocated, the shafts 70 and 71 will be rocked and will reciprocate the actuators 64—64, thereby causing the cam races 63—63 to oscillate the bell-crank levers 59—59, whereby the shafts 55—55 are oscillated through the rods 58—58 and cranks 57—57 and exhaust valves 51—51 are oscillated through the agency of the cranks 54—54 and arms 53—53.

Having described my invention, I claim:—

1. In a water engine, the combination with twin cylinders, pistons in said cylinders, and water inlet and outlet pipe connections communicating with the ends of said cylinders, of valves at opposite ends of said cylinders controlling the inlet of water to alternately drive said pistons in opposite directions, rotary exhaust valves in the ends of said cylinders, a shaft driven from said pistons, eccentrics driven from said shaft, connections between said eccentrics and the inlet valves whereby said valves are alternately opened and closed to admit and shut off the motive fluid, actuating means for said rotary valves comprising slotted actuators driven from said engine driven shaft, bell crank levers operated from said actuators, and connections between said bell-crank levers and said exhaust valves.

2. In a water engine, the combination with twin cylinders having pistons therein, and water inlet and outlet piping communicating with the ends thereof, a shaft driven from said pistons, flap valves hinged at the ends of said cylinders and controlling the water inlet to the cylinders, reciprocable slides driven from said shaft, actuating rods for said valves arranged to be alternately engaged and actuated by said reciprocable slides, crank connections between said rods and said valves, rotary exhaust valves in the ends of said cylinder, and operating connections between the engine driven shaft and said rotary valves whereby the cylinders are relieved of the motive fluid after it expends its force in driving the piston.

3. In a water engine, the combination with twin cylinders, water inlet and outlet pipe connections communicating with the ends of said cylinders, water driven pistons in said cylinders, a shaft driven by said pistons, of flap valves actuated from said shaft to alternately admit the motive fluid to said cylinders, cranks connected with said valves, connecting rods extending from said cranks in alinement with each other and controlled by springs to normally maintain the valves closed, reciprocating bumpers arranged between the ends of the valve-connecting rods and adapted to alternately engage said rods, and crank connections between said bumpers and said shaft.

4. In a water engine, the combination with twin cylinders having their ends connected with inlet and outlet water pipes, pistons within said cylinders, and a shaft driven from said pistons, of two flap valves hinged in the ends of each of said cylinders and controlling the admission of the motive fluid thereto, eccentrics driven by said shaft, levers connected to said eccentrics, connecting rods actuated by said levers, slides actuated by said connecting rods, and connections between said slides and said inlet valves.

5. In a water engine, the combination with twin cylinders having heads providing water inlet passages through the ends of said heads, and annular outlet passages through the sides of said heads, inlet pipes connecting with the ends of said heads and outlet or exhaust pipes connecting with the annular outlet passages in said heads, pistons in said cylinders, and a shaft driven by said pistons, of flap valves hinged in said heads and controlling the passage of water thereto, cranks connected to said valves, bumper rods connected to said cranks by link connections, a reciprocating member arranged between the ends of said rods to alternately engage the same, and connections between said reciprocating member and the shaft.

6. In a water engine, the combination with twin cylinders having pistons therein and heads providing end water inlets and side outlets, and a shaft driven by said pistons, of valves in said head controlling the inlet of water, connections between said valves and the shaft, cylindrical exhaust valves in the ends of said cylinders, double cranks connected to said cylindrical valves, bell-crank levers to which said double crank levers are connected, reciprocating slotted members engaging said bell-crank levers, levers connected to each of said slotted members, cross-heads to which said levers are also connected, and driving connections between said cross-heads and the engine-driven shaft.

In testimony whereof I affix my signature, in presence of two witnesses.

JAMES O'GARA.

Witnesses:
M. GALLOWAY,
M. SIERLER.

Copies of this patent may be obtained for five cents each, by addressing the "Commissioner of Patents, Washington, D. C."